United States Patent [19]

Chiron et al.

[11] 3,745,486

[45] July 10, 1973

[54] MICROWAVE INTEGRATED CIRCUIT

[75] Inventors: Bernard Chiron; Jean Puyhaubert, Paris 16, France

[73] Assignee: Societe Lignes Telegraphiques Et Telephoniques, Paris, France

[22] Filed: Mar. 1, 1972

[21] Appl. No.: 230,775

[52] U.S. Cl. ................................ 333/30, 333/84 M
[51] Int. Cl. ........................... H03h 7/30, H01p 3/08
[58] Field of Search ................ 333/84 M, 30, 30 M, 333/84

[56] References Cited

UNITED STATES PATENTS

| | | | |
|---|---|---|---|
| 3,401,360 | 9/1968 | Schulz-Du Bois | 333/30 R |
| 3,259,858 | 7/1966 | Meitzler | 333/30 UX |
| 3,296,555 | 1/1967 | Fraser et al. | 333/30 R X |
| 3,289,114 | 11/1966 | Rowen | 333/30 R |

OTHER PUBLICATIONS

Hickernell–"Piezoelectric Semiconductor Acoustic Delay Lines" in IEEE Transactions on Microwave Theory and Techniques Vol. MTT17 No. 11 Nov. 1969.

*Primary Examiner*—Rudolph V. Rolinec
*Assistant Examiner*—Marvin Nussbaum
*Attorney*—Solon B. Kemon et al.

[57] ABSTRACT

A microwave integrated circuit operating as an acoustic delay line comprises a substrate, at least an input strip line conductive pattern and an output strip line conductive pattern deposited on said substrate, at least one electroacoustic transducer between said lines and said substrate located so that the acoustic waves propagate within the substrate along a preferred axis.

6 Claims, 4 Drawing Figures

MICROWAVE INTEGRATED CIRCUIT

BACKGROUND OF THE INVENTION AND PRIOR ART

The present invention concerns a microwave circuit structure and more particularly a microwave integrated circuit consisting of a microwave acoustic delay line. Such circuits are usually called mic in the technical literature.

Mics are essentially made of a dielectric planar substrate on which printed circuits are deposited. The physical properties of the substrate are important to the propagation or the transformation of the microwaves. Acoustic delay lines for microwave use are well known per se. Such lines consist essentially of a microwave input circuit feeding a transducer which converts the electromagnetic energy into acoustic energy, the said transducer excits either a surface or a volume acoustic wave which travels at reduced velocity on or within an acoustic medium. The acoustic microwave is again converted into an electromagnetic microwave which is fed to a microwave output circuit. The microwave input and output circuits are electromagnetic microwave circuits matched with the technology used which adapt the impedance of the transducers to the impedance of standard microwave circuits. Such a device is described for instance in the French Pat. No. 2,087,743 filed on May 29, 1970, and in the U.S. copending Application Ser. No. 152,670 filed on June 14, 1971 for " Interconnecting electroacoustic delay lines with microwave circuits ".

Owing to the requirement for microminiaturisation which must be met by designers, microwave circuits are most often in the form of microstrip circuits, that is to say, they consist essentially of a dielectric substrate in the form of a wafer, one of the faces of which bears a continuous conductive coating, while its other face bears, in the form of printed circuits, a pattern which guides the propagation of the microwaves. Such circuits are well known to the person skilled in the art and are described for instance in volume III of the reports of the " Symposium On Microelectronics " which took place from Mar. 8, 1969 at Toulouse, France, and more precisely in the lectures III-10, III-19 and III-20 respectively by Messrs. B. CHIRON, L. DUFFAU and M. FACHE.

SUMMARY OF THE DISCLOSURE

The present invention concerns a fully integrated microwave delay line structure in which the solid medium serving for the propagation of the acoustic waves simultaneously performs the function of dielectric substrate for the associated microwave circuit. Consequently, the microwave input and output lines are deposited on the same substrate as the electroacoustic transducer.

Steps are taken to reduce any couplings which might establish between the two electromagnetic circuits. This may be obtained either by use of the continuous conductive coating of the microstrip circuit as a shielding means or by adding mechanical obstacles between the two circuits deposited on the same face of the substrate. The use of a material as an acoustic propagation means requires that it should be appropriately cut so that the propagation of the acoustic wave takes place along a direction suitably located with respect to the crystalline axes, as is well known. The selection of the material used as substrate is based on its acoustic properties. Preferably, materials having the lowest loss in the operating frequency range are used. It has been found that corundum has acoustic and electric characteristics which are particularly suitable to the design of an integrated delay line according to the invention.

The advantages of such a structure as compared with complex structures of the type described in the above mentioned patent and patent application are substantial, both from the viewpoint of bulk and from the viewpoint of weight. For example, in the case of a 2 $\mu$s delay line operating in the GHz range, the volume of a bare line (without housing) produced as stated in the aforesaid patent is twenty times as large as that of a completely integrated line having the same delay according to the present invention due to the reduction of the thickness of the integrated structure.

DETAILED DESCRIPTION OF THE INVENTION

Figure 1:
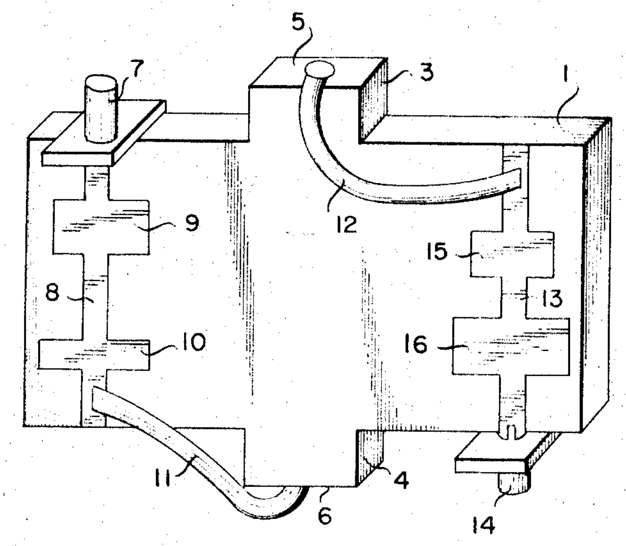
Figure 2:
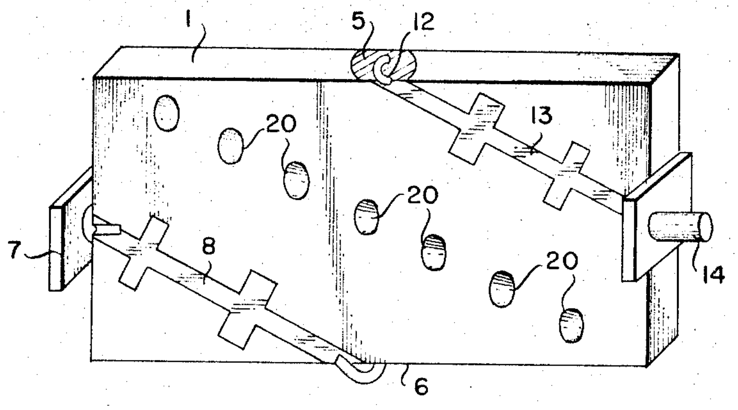
Figure 3:
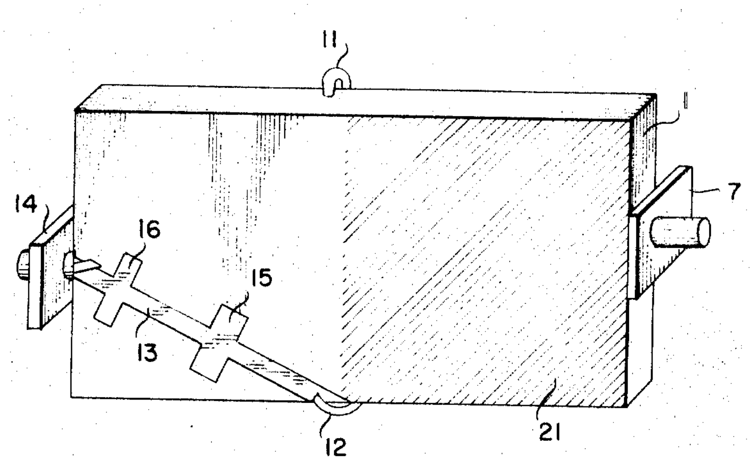
Figure 4:
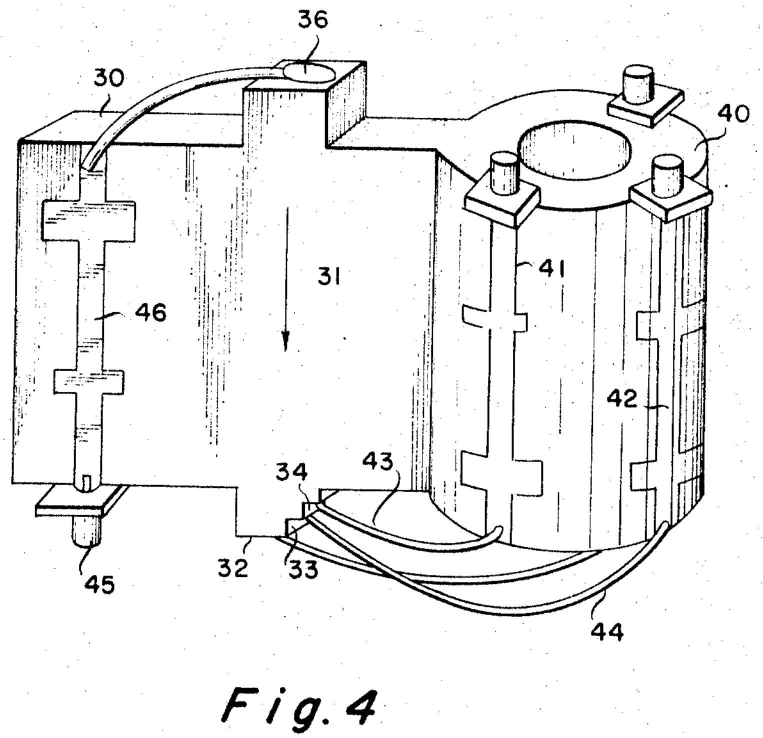

The invention will be readily understood with reference to the following description and to the accompanying figures, which are given by way of non-limiting illustration, and in which :

FIGS. 1, 2 and 3 are three constructional variants of a simple delay line, and FIG. 4 is a diagrammatic view of a completely integrated multiple-delay line.

In FIG. 1, there is shown at 1 the acoustic propagation medium serving as a substrate for the input and output microstrip microwave circuits. This substrate 1 is preferably in the form of a parallelepipedic corundum wafer. Along the crystalline C axis on two pins 3 and 4 are provided whose faces are polished. They support the transducers 5 and 6 consisting, for example, of deposited cadmium sulphide or zinc oxide films, in the manner well known to the person skilled in the art.

There is shown diagrammatically at 7 a coaxial input plug in electric contact with the input microstrip line 8 comprising two impedance matching sections 9 and 10. The end of the electric line 8 is connected to the transducer 6 by a flexible contact 11, for example of the type described in the second of the above-mentioned two applications. The output transducer 5 is likewise connected by a flexible contact 12 to the microwave output circuit 13 which feeds the coaxial output plug 14. The circuit 13 also comprises two impedance matching sections 15 and 16. The concealed face of the wafer is completely metal plated so as to terminate the microstrip circuit. Since it is particularly advantageous to minimise the dimensions of the wafer 1, the structure just described may in some cases introduce an unacceptable coupling between the lines 8 and 13, specially in lines with a small delay. It may reach about −40 dB for a delay of 2 $\mu$s. This coupling is reduced in the variant of FIG. 2. The parts common to the two designs bear the same reference numerals. As will be seen, the lines 8 and 13 are inclined with respect to the propagation axis of the acoustic waves, crystalline axis C which is perpendicular to the transducers 5 and 6. The parts constituting the delay line are identical to those constituting the variant of FIG. 1. Decrease of coupling between the lines 8 and 13 is obtained by drilling conical holes 20 along one of the diagonals of the substrate 1 which is parallel to the directions of the strip lines 8 and 13. A coupling of the order of −60 dB maximum for a delay of 2 $\mu$s is thus obtained.

FIG. 3 illustrates a constructional variant in which the input and output strip lines are located on the opposite faces of the substrate 1. As will be seen from the figure, the line 8 is situated on the concealed face of the substrate and one-half of the visible face of the latter is covered by the continuous conductor 21 which completes the microwave circuit of the line 8 disposed on the concealed face. With such a variant, it is possible to reach a maximum coupling between the input and the output of the order of $-$ 65 dB for a delay of 2 $\mu$s.

The structure of FIG. 4 relates to a multiple-delay line, that is to say, it is a structure having only one input and a number of outputs, three in the example illustrated in the figure, such that the delay of the waves between the input and each of the respective outputs varies. As will be apparent, the substrate has a more complex shape than the parallelepipedic wafer of the preceding constructions. It consists essentially of a substantially parallelepipedic first part 30, in which, however, one of the faces perpendicular to the axis C of acoustic propagation 31 shows steps such as 32, 33, 34, (three in the illustrated example) forming an echelon. These steps correspond to different lengths of the paths of the acoustic waves launched by the input transducer 36. Each of these steps supports the transducer feeding one of the output circuits. The input transducer is shown at 36 and the corundum axis c is directed perpendicular to the faces 36–32. The substrate comprises a second cylindrical part 40 whose external surface bears uniformly distributed output lines such as 41 and 42 connected by flexible conductors 43 and 44 respectively to the associated transducer. The internal face of the cylinder is entirely conductively plated so as to complete the microstrip structure of the output circuits.

45 is the input plug feeding the microstrip input line 46 made of the impedance matching sections. The rear face of the parallelepipedic part 30 of the substrate is completely conductively plated. In an integrated line construction operating at 2 GHz with a delay of 2 $\mu$s, the standing wave ratio is 1.4, the direct coupling (leakage) is 65 dB below the input signal, the third echo 20 dB below the first, and the attenuation is 37 dB.

What we claim :

1. A microwave integrated delay line structure comprising:

a dielectric base for the propogation of acoustic waves;

an input strip line including an impedance matching section deposited on said base;

at least one output strip line including an impedance matching section deposited on said base and spaced from said first line;

an electro-acoustic input transducer deposited on said base, connected to one end of said input strip line and operative when energized to cause the propagation of acoustic waves within said base;

at least one electro-acoustic output transducer deposited on said base and connected to one end of said output strip line;

means affording connection of an electrical signal to the opposite end of said input strip line; and means affording connection of an output device to the opposite end of said output line.--

2. A microwave integrated delay line structure as defined by claim 1 in which said input and output strip lines consist of conductive patterns deposited on the same face of said base and a continuous conductive plane located on another face of said base.--

3. A microwave integrated delay line structure as defined by claim 1 in which said input and output strip lines consist of conductive patterns located on two different faces of said base.--

4. A microwave integrated delay line structure as defined by claim 2 in which said base includes at least one conical hole positioned between said input and output strip lines.--

5. A microwave integrated delay line structure as defined by claim 1 in which said base is a monocrystalline wafer.--

6. A microwave integrated delay line structure as defined by claim 1 in which said base includes a first substantially rectangular parallelopiped-shaped part having a plurality of steps extending out of one face thereof and a second part integral with the first in the shape of a hollow cylinder, said input strip line and input transducer being formed on said first part;

a plurality of output transducers formed one on each of said steps;

an equal number of output strip lines formed on the external surface of said second part of said medium and having one end connected to one of said output transducers respectively; and a metal coating on the inner surface of the said second part.--

* * * * *

UNITED STATES PATENT OFFICE

CERTIFICATE OF CORRECTION

Patent No. 3,745,486 Dated July 10, 1973

Inventor(s) Bernard Chiron, Jean Puyhaubert

It is certified that error appears in the above-identified patent and that said Letters Patent are hereby corrected as shown below:

[30] French Application No. 71.07.661 filed on March 5, 1971. (Priority Data)

Signed and sealed this 19th day of November 1974.

(SEAL)
Attest:

McCOY M. GIBSON JR.
Attesting Officer

C. MARSHALL DANN
Commissioner of Patents